United States Patent
Lydecker

(10) Patent No.: US 10,950,393 B2
(45) Date of Patent: Mar. 16, 2021

(54) SWITCH ASSEMBLY WITH FRONT SIDE REMOVABILITY

(71) Applicant: Carling Technologies, Inc., Plainville, CT (US)

(72) Inventor: Adam Charles Lydecker, Burlington, CT (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 15/929,927

(22) Filed: May 29, 2020

(65) Prior Publication Data

US 2020/0381193 A1    Dec. 3, 2020

Related U.S. Application Data

(60) Provisional application No. 62/854,607, filed on May 30, 2019.

(51) Int. Cl.
*H01H 13/14*    (2006.01)
*H01H 9/08*    (2006.01)
*H01H 13/04*    (2006.01)

(52) U.S. Cl.
CPC .............. *H01H 13/14* (2013.01); *H01H 9/08* (2013.01); *H01H 13/04* (2013.01)

(58) Field of Classification Search
CPC ........... H01H 13/14; H01H 9/08; H01H 13/04
USPC ........................................................ 200/341
See application file for complete search history.

(56) References Cited

U.S. PATENT DOCUMENTS

| | | | |
|---|---|---|---|
| 6,325,335 B1 * | 12/2001 | Harvey | G02B 6/3816 248/27.1 |
| 6,363,199 B1 * | 3/2002 | Carberry | G02B 6/3807 385/134 |

FOREIGN PATENT DOCUMENTS

| | | |
|---|---|---|
| EP | 2789262 | 10/2014 |
| WO | WO2017008069 | 1/2017 |

* cited by examiner

*Primary Examiner* — Edwin A. Leon
*Assistant Examiner* — Iman Malakooti
(74) *Attorney, Agent, or Firm* — Forge IP, PLLC

(57) ABSTRACT

A switch assembly includes a panel defining an aperture therethrough and a switch subassembly having a switch housing. At least one tab extends from the housing, the tab having a first portion extending away from the housing and toward the back side of the panel to a projection, the projection spaced in a longitudinal direction from the back side of the panel and laterally outward of the aperture when the tab is in a relaxed state, and a second portion that extends from the projection in the longitudinal direction and terminates in a tab end disposed within the aperture. The tab end is accessible from the front side of the panel and the tab is sufficiently flexible such that flexing the tab end inwardly from the front side causes the projection to flex inwardly from the relaxed state to a point where the projection can pass through the aperture.

26 Claims, 5 Drawing Sheets

SWITCH ASSEMBLY WITH FRONT SIDE REMOVABILITY

FIELD OF THE INVENTION

The present invention relates generally to switch assemblies of the type that are adapted to be retained in a switch panel, and more specifically, to a system and method for retaining, in a removable fashion, such switch assemblies in the corresponding switch panels.

BACKGROUND OF THE INVENTION

Panel mounted switch assemblies are well known. However, in order to install, and/or particularly to remove, many known switch assemblies, manipulation from the rear of a panel is generally required. In other cases, know switch assemblies, if they do allow for installation and/or removal from the front at all, require the use of special tools in order to achieve such. It would be desirable instead to allow a switch assembly to be removable from the front side of a panel with no special tools and without damage to the switch being removed or to adjacent switches or the panel.

However, achievement of these goals has heretofore presented a number of challenges. For one, it is desirable for the switch to be mounted flush with panel (i.e. all switch components are below the surface, with nothing easily accessible). Additionally, it is desirable for there to be provided a small gap between switches or between the switch and the panel (e.g., providing on the order of a 0.5 to 1.0 mm gap). Furthermore, it is desirable for there to be no added features visible from the front of the switch panel (e.g., for all features to be at least be 0.210" (5.3 mm) below the surface of the panel). Moreover, it is desirable for there to be a relatively high retention force of the switch in the panel (e.g., requiring greater than 50 N of force for removal). On the other hand, it is desirable for the removal force to be low enough with applied leverage to not damage adjacent switches (or the switch panel). It would additionally be desirable for the switch to be allowed to be removed with no special tools (e.g., a screwdriver can be used).

In this regard, previously known options for front removability of switch assemblies from switch panels have involved various shortcomings. In some designs, a significantly reduced retention force has been employed. This approach, which is likely the most commonly used prior art method, risks switches being accidentally removed (e.g. panel retention is less resistant to mechanical shock and vibration, force from rear of switch from any source, such as wire harness, etc.). In other designs, the switch is raised to extend from panel (which approach is usually needed in combination w/reduced retention force). However, this approach does not satisfy visual appearance criteria preferred by some customers.

Another technique employed by some prior art designs is to add parts that allow for front removability (e.g., to provide removable parts covering panel clips, or provide additional parts that actuate panel clips). However, this technique means that additional parts would be visible from the operator side, which again, may not satisfy customer aesthetic preferences. In addition, or instead, the gap between adjacent switches or switches and the panel may be increased. Again, however, this approach may not satisfy customer aesthetic preferences, and also may lead to collection of debris.

The present invention, on the other hand, allows for a switch assembly to be removable from the front side of a panel with no special tools and without damage to the switch being removed or to adjacent switches or the panel, while at the same time avoiding most, if not all, of the deficiencies associated with known prior art designs.

SUMMARY OF THE INVENTION

In accordance with one aspect of the present invention, a switch assembly includes a panel having a front side and a back side, the panel defining an aperture therethrough, the aperture having an edge surface perpendicular to the front and back sides. The switch assembly also includes a switch subassembly disposed through the aperture and having a switch housing defining a longitudinal direction that is perpendicular to the panel, and having an outer periphery dimensioned to fit within the edge surface of the aperture of the panel. At least one tab extends from the switch housing adjacent the back side of the panel, the at least one tab having a first portion that extends away from the switch housing and toward the back side of the panel to a projection, the projection spaced in the longitudinal direction from the back side of the panel and laterally outward of the edge surface of the aperture when the at least one tab is in a relaxed state, the at least one tab having a second portion that extends from the projection in the longitudinal direction and terminates in a tab end disposed within the aperture of the panel. The tab end of the at least one tab is accessible from the front side of the panel and the at least one tab is sufficiently flexible such that flexing the tab end inwardly from the front side of the panel causes the projection to flex inwardly from the relaxed state to a point where the projection can pass through the aperture to facilitate removal of the switch subassembly from the front side of the panel.

In some embodiments, the at least one tab comprises two tabs disposed on opposing sides of the switch housing. In certain of these embodiments, each tab has a first portion that extends away from the switch housing, and the first portions of the two tabs extend outwardly from the switch housing in opposite directions.

In some embodiments, the projection of the at least one tab is tapered on a side thereof adjacent to the first portion in order to facilitate insertion of the switch subassembly through the aperture from the front side of the panel. In some embodiments, the at least one tab flexes inwardly toward the switch housing as the switch subassembly is inserted through the aperture in the panel and then flexes outwardly as the switch subassembly is fully seated in the aperture such that the at least one tab engages the aperture in the panel to secure the switch subassembly in the aperture.

In some embodiments, the at least one tab is formed of a resilient material. In certain of these embodiments, the at least one tab is formed of spring steel.

In some embodiments, the tab end terminates at a point between the front side and the back side of the panel. In some embodiments, the tab end terminates at a point between the edge surface of the aperture of the panel and the switch subassembly.

In some embodiments, the switch subassembly further comprises at least one push button actuator actuatable in the longitudinal direction. In certain of these embodiments, the tab end terminates at a point between the edge surface of the aperture of the panel and the at least one push button actuator. In certain of these embodiments, the at least one push button actuator includes a cutout that accommodates the tab end. In certain of these embodiments, the cutout allows for a plurality of switch subassemblies to be disposed with the tabs thereof adjacent to one another while maintaining a uniform gap between push button actuators disposed on one switch subassembly and between push button actuators disposed on adjacent switch subassemblies.

In some embodiments, a gap between the edge surface of the aperture and the at least one push button actuator is at most 1 mm. In certain of these embodiments, the gap between the edge surface of the aperture and the at least one push button actuator is between 0.5 mm and 1 mm. In some embodiments, a retention force of the switch subassembly within the aperture of the panel is at least 50 N.

In accordance with another aspect of the present invention, a switch assembly includes a panel having a front side and a back side, the panel defining an aperture therethrough, the aperture having an edge surface perpendicular to the front and back sides, and a switch subassembly disposed through the aperture and having a switch housing defining a longitudinal direction that is perpendicular to the panel, and having an outer periphery dimensioned to fit within the edge surface of the aperture of the panel. At least two tabs extend from opposite sides of the switch housing adjacent the back side of the panel, each of the at least two tabs having a first portion that extends away from the switch housing and toward the back side of the panel to a projection, the projection spaced in the longitudinal direction from the back side of the panel and laterally outward of the edge surface of the aperture when the at least two tabs are in a relaxed state, each of the at least two tabs having a second portion that extends from the projection in the longitudinal direction and terminates in a tab end disposed within the aperture of the panel. The tab end of each of the at least two tabs is accessible from the front side of the panel and each of the at least two tabs is formed of a resilient material that is sufficiently flexible such that flexing the tab end inwardly from the front side of the panel causes the projection to flex inwardly from the relaxed state to a point where the projection can pass through the aperture to facilitate removal of the switch subassembly from the front side of the panel. The at least two tabs flex inwardly toward the switch housing as the switch subassembly is inserted through the aperture in the panel and then flex outwardly as the switch subassembly is fully seated in the aperture such that the at least two tabs engage the aperture in the panel to secure the switch subassembly in the aperture. The tab end of each of the at least two tabs terminates at a point between the front side and the back side of the panel and at a point between the edge surface of the aperture of the panel and the switch subassembly.

In some embodiments, the projection of each of the at least two tabs is tapered on a side thereof adjacent to the first portion in order to facilitate insertion of the switch subassembly through the aperture from the front side of the panel. In some embodiments, the at least two tabs are formed of spring steel.

In some embodiments, the switch subassembly further comprises at least one push button actuator actuatable in the longitudinal direction. In certain of these embodiments, the tab end terminates at a point between the edge surface of the aperture of the panel and the at least one push button actuator. In certain embodiments, the at least one push button actuator includes a cutout that accommodates the tab end. In certain of these embodiments, the cutout allows for a plurality of switch subassemblies to be disposed with the tabs thereof adjacent to one another while maintaining a uniform gap between push button actuators disposed on one switch subassembly and between push button actuators disposed on adjacent switch subassemblies.

In some embodiments, a gap between the edge surface of the aperture and the at least one push button actuator is at most 1 mm. In certain of these embodiments, the gap between the edge surface of the aperture and the at least one push button actuator is between 0.5 mm and 1 mm. In some embodiments, a retention force of the switch subassembly within the aperture of the panel is at least 50 N.

Other features and advantages of the invention will become more apparent from consideration of the following drawing.

DETAILED DESCRIPTION OF THE INVENTION

Figure 1A:
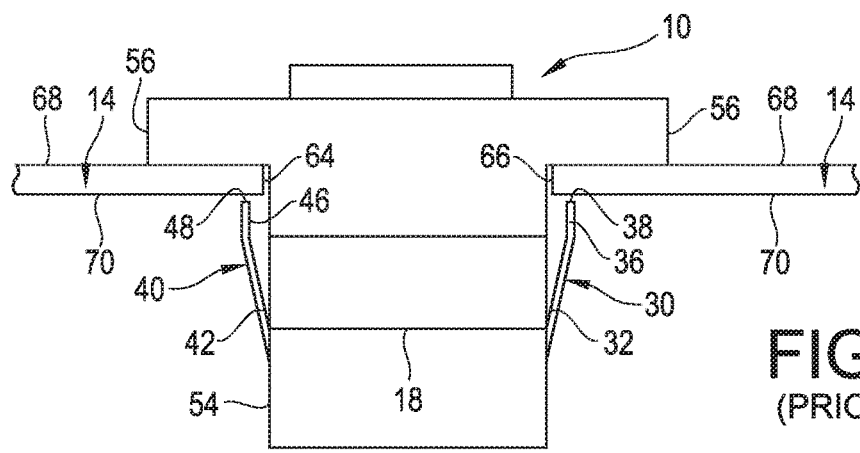
FIG. 1A is a partial side view depicting a prior art switch assembly installed in a panel.
Figure 1B:
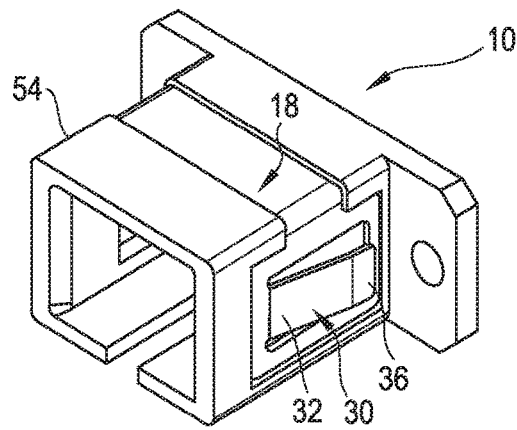
FIG. 1B is an isometric view of the prior art switch assembly of FIG. 1A prior to installation in a panel.
Figure 1C:
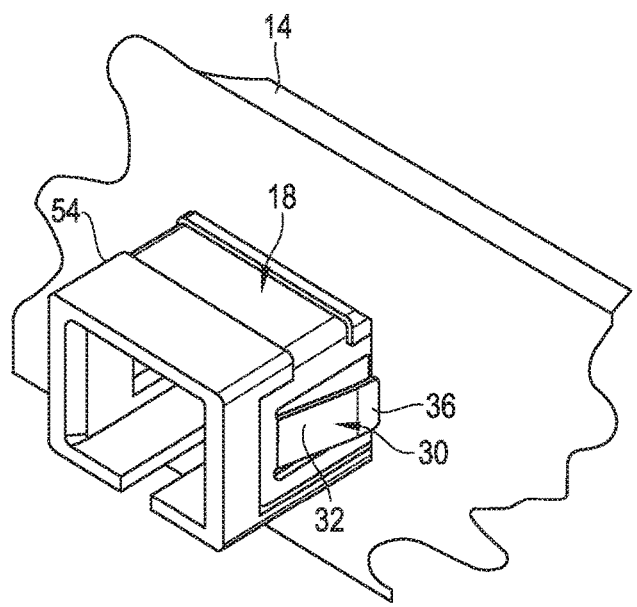
FIG. 1C is an isometric view of the prior art switch assembly of FIG. 1A installed in a panel.

Referring first to FIGS. 1A-1C of the drawings, a prior art panel mounted switch assembly (10) is shown. As mentioned briefly above, and as discussed more fully below, in order remove the switch assembly (10) from a panel (14), manipulation from the rear of the panel (14) is generally required.

The switch assembly (10) includes a clip (18) that is formed of spring steel, such as 304 stainless steel. The clip (18) includes a first tab (30) extending from a first side in a cantilevered manner and has a first portion (32) which extends generally away from the plane of the first side when exposed to no external force and a second portion (36) which extends generally parallel the plane up to the end (38) of the first tab (30). Similarly, a second tab (40) extends from a second side of the clip (18) and has a first portion (42) which extends at an angle away from a plane containing the second side when exposed to no external force and a second portion (46) extending generally parallel the plane when exposed to no external force, extending up to the end (48) of the second tab (40).

The clip (18) is attached to a plastic housing (54) which has a front portion having arms (56) which extend outwardly from the housing (54). The clip (18) is oriented on the housing (54), as best seen in FIG. 1A, with the ends (38, 48) of the tabs (30, 40) facing the arms (56).

As can be readily understood, the housing (54), and clip (18) as secured thereon, can be inserted through an aperture in panel (14). The aperture is shown as rectangular having opposed edges (64) and (66). As the housing (54) and clip (18) are inserted into the aperture from the front side (68) of the panel (14), as seen in FIG. 1A, the first and second tabs (30, 40) are resiliently pushed inwardly toward the housing (54) to allow the tabs (30, 40) to pass between opposed edges (64, 66). As the ends (38, 48) come free of the edges (64, 66), the first and second tabs (30, 40) spring outwardly, causing the ends (38, 48) to face the back side (70) of the panel (14) and thus prevent the clip (18) and housing (54) from being removed from the panel (14) from the front side (68) thereof.

Thus, as can be understood, to remove the housing (54) and clip (18) from the panel (14), access would be necessary to the interior of the device on which the panel (14) is mounted, to allow manual compression of the first and second tabs (30, 40) to allow the ends (38, 48) to clear the opposed edges (64, 66) of the aperture in the panel (14).

Figure 2:
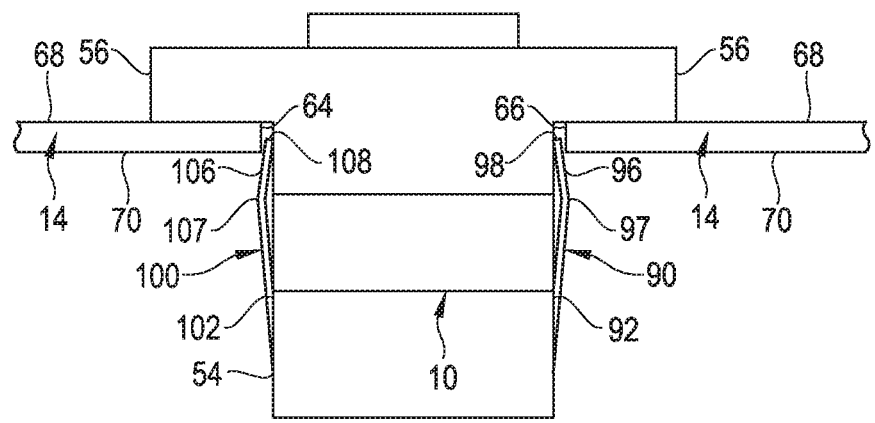
FIG. 2 is a partial side view depicting another prior art switch assembly installed in a panel, this prior art assembly purporting to allow for front side removability.

As discussed above, previous attempts have been made to provide a switch assembly that allows for removal from the front side of the panel (i.e., the same side through which the switch assembly is inserted and operated). Turning now to FIG. 2, one such prior art attempt is illustrated.

This second prior art switch assembly, like the one described above, also includes a clip (10) that is formed of an integral piece of spring steel, such as 304 stainless steel. The clip (10) includes a first tab (90) extending from a first side thereof, which first tab (90) includes a first portion (92) which extends generally outwardly from a plane containing the first side and a second portion (96) which extends generally toward the plane when not exposed to an external force, up to the end (98) of the first tab (90). The point at which second portion (96) begins extending back toward the plane defines an apex (97) of the first tab (90).

Similarly, a second tab (100) extends from a second side of the clip (10) and has a first portion (102) which extends generally away from a plane containing the second side and a second portion (106) which extends generally toward the plane to the end (108) of the second tab (100). The point at which second portion (106) begins extending back toward the plane defines an apex (107) of the second tab (100).

As can be appreciated, the clip (10) is mounted on the housing (54) in a similar manner to the clip (18) described above in connection with the first prior art embodiment. The clip (10) and housing (54) can then be mounted in the panel (14) from the front side (68) thereof. The first and second tabs (90, 100) resiliently flatten as apexes (97, 107) deflect inward as they pass the opposed edges (64, 66) of the aperture in panel (14). Once apexes (97, 107) pass edges (64, 66), they begin moving outward. At the point of full insertion where the arms (56) move into contact with the front side (68) of the panel (14), the ends (98, 108) do not clear the edges (64, 66). Additionally, apexes (97, 107) are disposed outside of edges (64, 66) against the back side (70) of the panel (14); thus, the housing (54) is held in the panel (14) by the clip (10) by the resiliency of the first and second tabs (90, 100) at all times.

Again, with respect to the tabs (30, 40) of the clip (18) of the above-described prior art embodiment shown in FIGS. 1A-1C, after the ends (38, 48) clear the edges (64, 66) of the aperture, they generally spring outward to their normal configuration in the absence of external forces. On the other hand, with the embodiment shown in FIG. 2, the first and second tabs (90, 100) are designed to provide sufficient resilient force to hold the housing (54) in place within the panel (14) so that a switch assembly disposed on the front side (68) of the panel (14) can be removed and installed without the clip (10) being released from the rear side (70) of the panel (14).

More specifically, when the housing (54) is to be removed from the panel (14) from the front side (68) of the panel (14) for cleaning, testing and inspection, repair or replacement, etc., a pulling force is applied sufficient to flatten the first and second tabs (90, 100) to deflect the apexes (97, 107) inward enough to clear the edges (64, 66) of the aperture, and to pull the housing (54) and clip (10) from the panel (14).

As noted above, however, while this prior art design shown in FIG. 2, unlike the prior art design shown in FIGS. 1A-1C, may allow for insertion and removal from the front of the panel only, such is achieved by employing a significantly reduced retention force. Thus, this approach risks switches being accidentally removed (e.g. panel retention is less resistant to mechanical shock and vibration, force from rear of switch from any source, such as wire harness, etc.).

Figure 3:
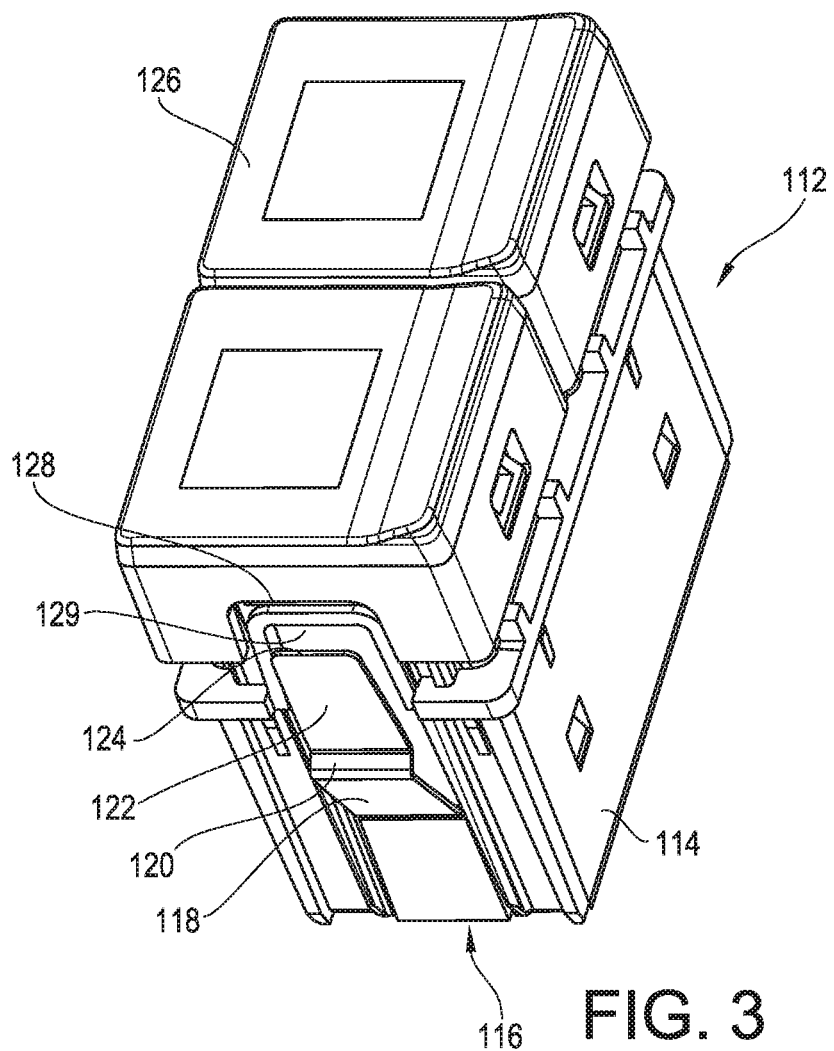
FIG. 3 is a front isometric view of a switch subassembly portion of a switch assembly according to one exemplary embodiment of the present invention, shown prior to installation in a panel.
Figure 4:
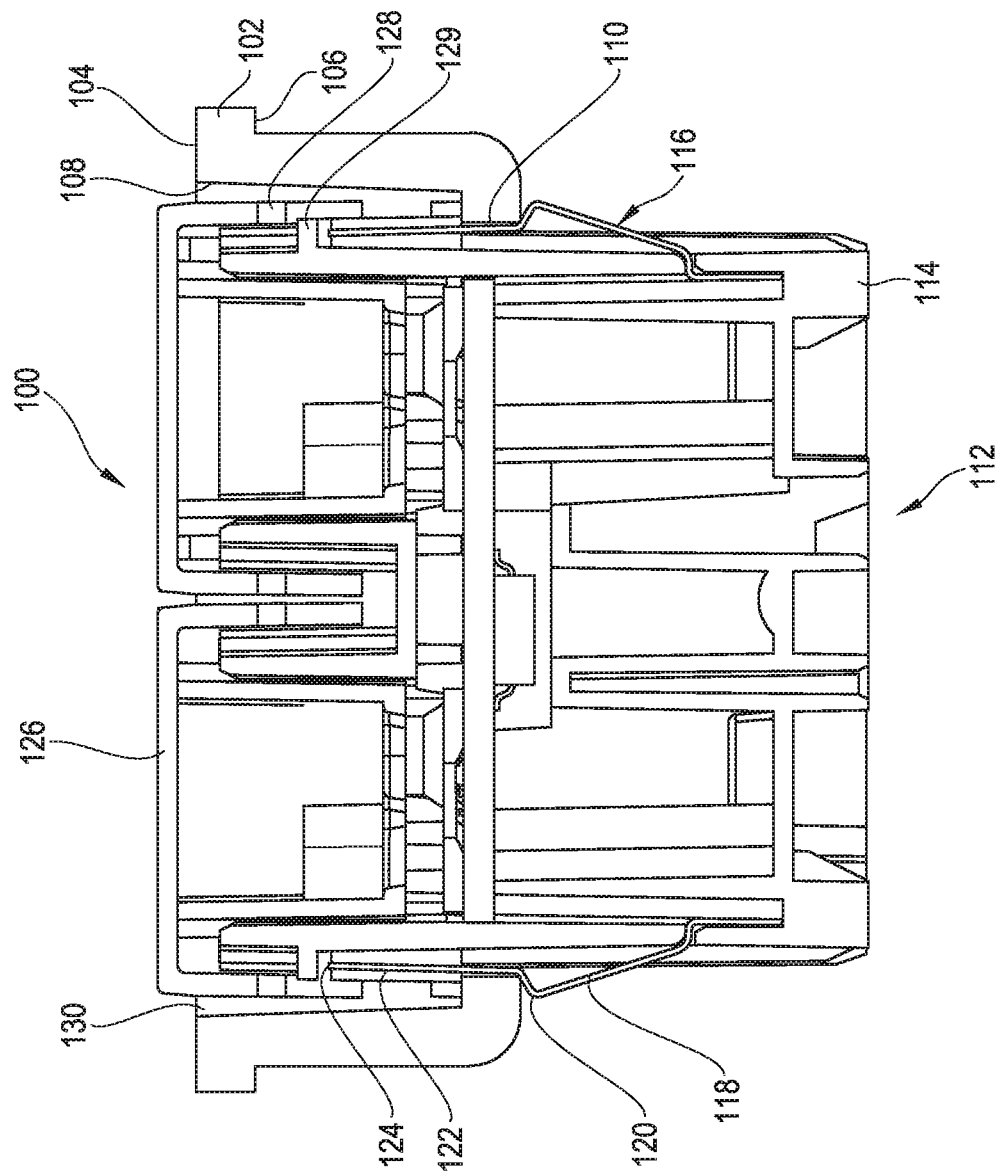
FIG. 4 is a partially cross-sectional side view of the switch subassembly of FIG. 3, shown installed in a panel.
Figure 5:
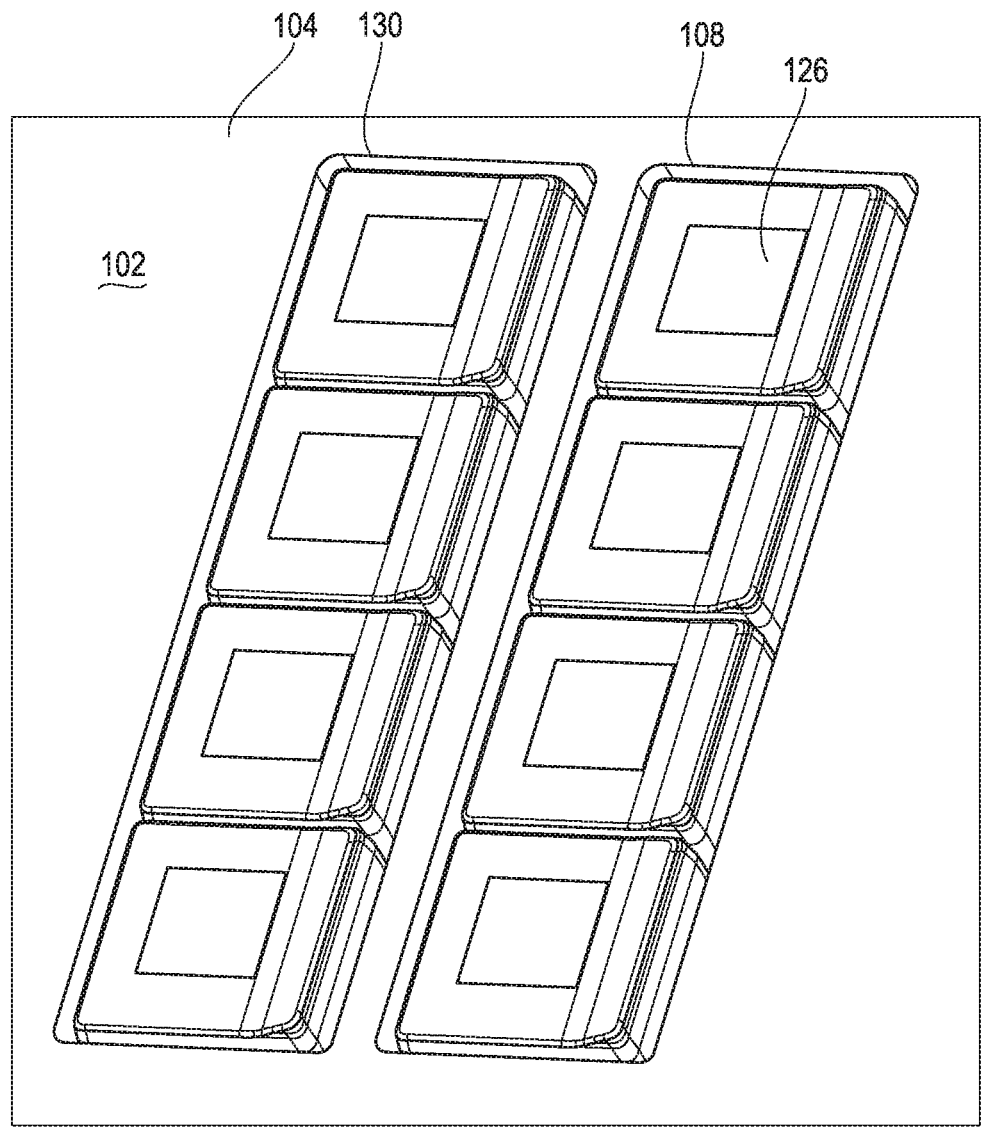
FIG. 5 is a front isometric view of a switch panel having installed therein four switch subassemblies according to FIG. 3.

Turning now to FIGS. 3-5, an exemplary switch assembly (100) with front side removability in accordance with the present invention is shown.

In accordance with the illustrated exemplary embodiment, the switch assembly (100) includes a panel (102) having a front side (104) and a back side (106), the panel defining an aperture (108) therethrough, the aperture (108) having an edge surface (110) perpendicular to the front and back sides (104, 106).

The switch assembly (100) also includes a switch subassembly (112) disposed through the aperture (108) and having a switch housing (114) defining a longitudinal direction that is perpendicular to the panel (102), and having an outer periphery dimensioned to fit within the edge surface (110) of the aperture (108) of the panel (102).

At least one tab (116) extends from the switch housing (114) adjacent the back side (106) of the panel (102), the at least one tab (116) having a first portion (118) that extends away from the switch housing (114) and toward the back side (106) of the panel (102) to a projection (120), the projection (120) spaced in the longitudinal direction from the back side (106) of the panel (102) and laterally outward of the edge surface (110) of the aperture (108) when the at least one tab (116) is in a relaxed state, as best seen in FIG. 4.

The at least one tab (116) also has a second portion (122) that extends from the projection (120) in the longitudinal direction and terminates in a tab end (124) disposed within the aperture (108) of the panel (102), again as best seen in FIG. 4. The tab end (124) of the at least one tab (116) is accessible from the front side (104) of the panel (102) and the at least one tab (116) is sufficiently flexible such that flexing the tab end (124) inwardly from the front side (104) of the panel (102) causes the projection (120) to flex inwardly from the relaxed state to a point where the projection (120) can pass through the aperture (108) to facilitate removal of the switch subassembly (112) from the front side (104) of the panel (102).

In the embodiment shown, two tabs (116) are shown being disposed on opposing sides of the switch housing (114). As best seen in FIG. 4, the first portion (118) of each tab (116) that extends away from the switch housing (114) does so in opposite directions.

It should be understood by those skilled in the art that only a single tab (116) may be provided on one side of the switch housing (114), in which case, the opposite side of the switch housing (114) may be retained in the panel (102) by some other mechanism. Alternately, more than two tabs (116) may be provided if desired. For example, two tabs (116) may be provided on each of two opposing sides of the switch housing (114), one tab (116) may be provided on each of four sides of the switch housing (114), etc.

Preferably, as best seen in FIG. 4, the projection (120) of the at least one tab (116) is tapered on a side thereof adjacent to the first portion (118) in order to facilitate insertion of the switch subassembly (112) through the aperture (108) from the front side (104) of the panel (102). Preferably, there is no taper (i.e., a shoulder) or there is less of a taper (as shown in FIG. 4) on the side of projection (120) adjacent to the second portion (122) in order to provide an adequate retention force once the switch subassembly (112) is seated in the aperture (108) of the panel (102).

It will be recognized that the at least one tab (116) flexes inwardly toward the switch housing (114) as the switch subassembly (112) is inserted through the aperture (108) in the panel (102) and then flexes outwardly as the switch subassembly (112) is fully seated in the aperture (108) (as shown in FIG. 4) such that the at least one tab (116) engages the aperture (108) in the panel (102) to secure the switch subassembly (112) in the aperture (108).

The at least one tab (116) is formed of a resilient material, which may be a plastic material, although it has been found that forming the at least one tab (116) from spring steel is desirable, as it allows for a high retention force to be realized, while allowing the tab (116) to remain relatively thin.

As can best be seen in FIG. 4, and with reference to the orientation shown therein, the tab end (124) terminates vertically at a point between the front side (104) and the back side (106) of the panel (102), and horizontally at a point between the edge surface (110) of the aperture (108) of the panel (102) and the switch subassembly (112).

In the shown embodiment, the switch is a push button switch, such that the switch subassembly (112) further comprises at least one push button actuator (126) actuatable in the longitudinal direction. The switch subassembly (112) may include only a single push button actuator (126), or may include multiple push button actuators (126), as desired, with two being shown in FIGS. 3 and 4, and four switch subassemblies (112), each including two push button actuators (126), being shown in FIG. 5.

As best seen in FIG. 4, when the switch is a push-button switch, the tab end (124) may terminate at a point between the edge surface (110) of the aperture (108) of the panel (102) and the at least one push button actuator (126). When such is the case, the at least one push button actuator (126) may include a cutout (128) that accommodates an extension (129) of the housing (114) with a recess that accommodates the tab end (124).

Preferably, a gap (130) between the edge surface (110) of the aperture (108) and the at least one push button actuator (126) is at most 1 mm, with the gap (130) having a thickness of between 0.5 mm and 1 mm being found to be advantageous in most circumstances, as it allows for removal of the switch assembly (as discussed more fully below), while still providing an aesthetically pleasing design and inhibiting debris from collecting therein.

By providing the aforementioned cutout (128) that accommodates the extension (129) of the housing (114) with a recess that accommodates the tab end (124), multiple switch subassemblies (112) can be disposed adjacent to one another (as shown in FIG. 5), while maintaining a uniform gap between push button actuators disposed on one switch subassembly and between push button actuators disposed on adjacent switch subassemblies. For example, a uniform gap of between 0.5 mm and 1.0 mm may be provided between switch to mounting panel and switch to switch, such that many switches can be ganged to have 2, 4, 10 or even more push button actuators inline all being with uniform gap.

By employing the above-described configuration, it has been found that a retention force of the switch subassembly (112) within the aperture (108) of the panel (102) of at least 50 N can be achieved.

Figure 6C:
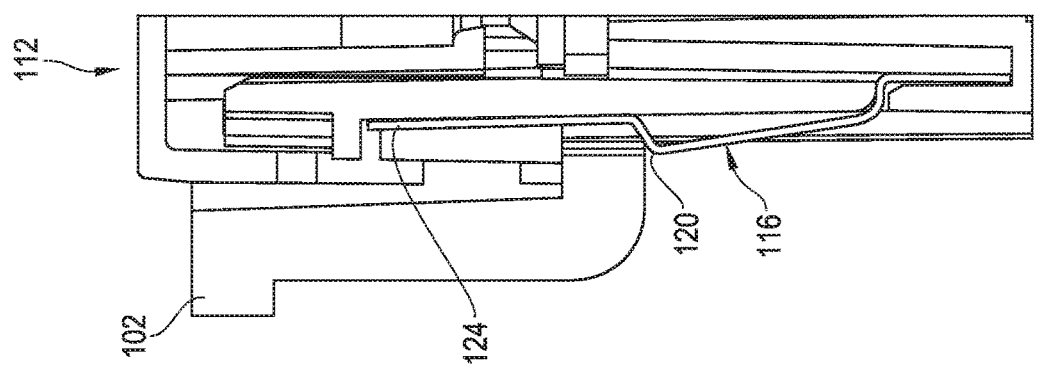
FIGS. 6A-6C are partially cross-sectional side views of the switch subassembly of FIG. 3 illustrating the positions of the tabs when the switch subassembly is not installed in a panel (FIG. 6A), when the switch subassembly is seated in a panel (FIG. 6B), and when the legs have been pressed in so as to facilitate removal of the switch subassembly from the panel (FIG. 6C).
Figure 6B:
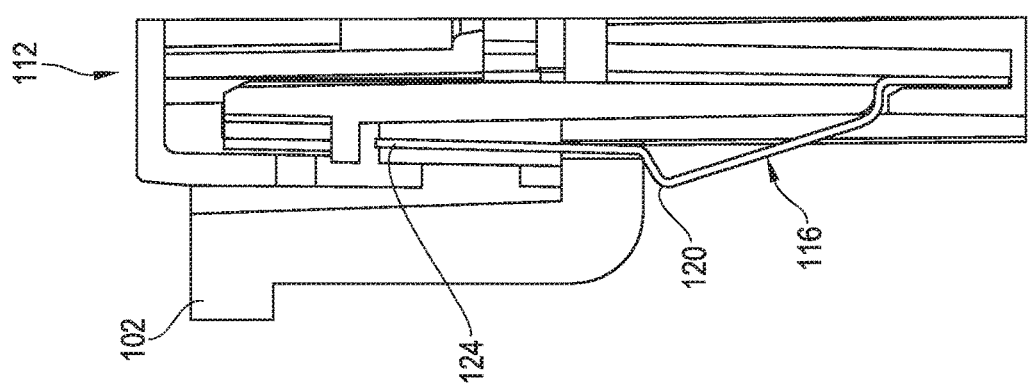
Figure 6A:
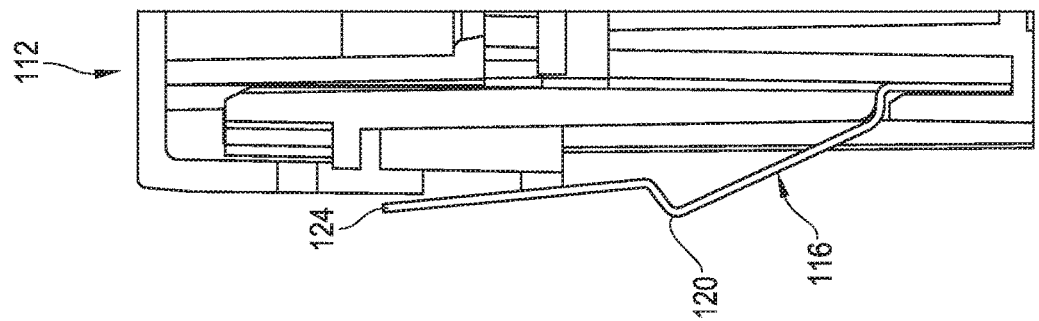

Turning now to FIGS. 6A-6C, the positions of the tabs (116) in various states is highlighted. In FIG. 6A, the switch subassembly (112) is not installed in the panel (102). As can be seen, the tab end (124) is flexed furthest outward as compared to the positions thereof shown in FIGS. 6B and 6C.

FIG. 6B illustrates the switch subassembly (112) disposed in the panel (102) in a fully seated (i.e., engaged) state. The tab end (124) is flexed inwardly as compared to the orientation shown in FIG. 6B, and the tab projection (120) is fully engaged with the shoulder of the panel aperture. Thus, the switch assembly (112) is retained in the panel with its maximum retention force.

FIG. 6C illustrates the switch subassembly (112) disposed ii the panel (102); however, the tab ends (124) have been flexed fully inwardly, such as for example, by the tip of a flat head screwdriver (not shown). In this state, the tab projection (120) is only partially engages with the shoulder of the panel aperture, or does not engage it at all. Thus, in this state, removal of the switch assembly (112) from the panel (102) is facilitated.

The present invention, thus, allows for a switch assembly to be removable from the front side of a panel with no special tools and without damage to the switch being removed or to adjacent switches or to the panel, while at the same time avoiding most, if not all, of the deficiencies associated with known prior art designs.

For removal, a common tool (e.g., a thin flat-head screwdriver) is positioned in the gap adjacent to the switch and used as a lever to: (1) flex the panel tab in, thereby reducing or eliminating the panel retention on that side, and (2) apply a force to the bottom of a ledge on the switch housing, which pulls that side of the switch up until it is no longer retained in the panel.

The next step can be to either: (1) continue using the tool on the same side of the switch as a lever until the panel retention tab on the opposite side of the switch is overcome and the switch can be removed; or (2) reposition the tool on the opposite side of the switch where the second panel tab is still engaged, and repeat the process of applying leverage to the panel tab and housing ledge. The switch subassembly can then be completely removed.

Although the invention has been described with reference to a particular arrangement of parts, features and the like, these are not intended to exhaust all possible arrangements or features, and indeed many other modifications and variations will be ascertainable to those of skill in the art.

What is claimed is:
1. A switch assembly comprising:
a panel having a front side and a back side, said panel defining an aperture therethrough, the aperture having an edge surface perpendicular to the front and back sides;
a switch subassembly disposed through the aperture and having a switch housing defining a longitudinal direction that is perpendicular to said panel, and having an outer periphery dimensioned to fit within the edge surface of the aperture of said panel;

at least one tab extending from the switch housing adjacent the back side of said panel, said at least one tab having a first portion that extends away from said switch housing and toward the back side of said panel to a projection, the projection spaced in the longitudinal direction from the back side of the panel and laterally outward of the edge surface of the aperture when said at least one tab is in a relaxed state, said at least one tab having a second portion that extends from the projection in the longitudinal direction and terminates in a tab end disposed within the aperture of said panel;

wherein the tab end of said at least one tab is accessible from the front side of said panel and wherein said at least one tab is sufficiently flexible such that flexing the tab end inwardly from the front side of said panel causes the projection to flex inwardly from the relaxed state to a point where the projection can pass through the aperture to facilitate removal of the switch subassembly from the front side of said panel.

2. The switch assembly of claim 1 wherein said at least one tab comprises two tabs disposed on opposing sides of the switch housing.

3. The switch assembly of claim 2 wherein each tab has a first portion that extends away from said switch housing, and wherein the first portions of the two tabs extend outwardly from the switch housing in opposite directions.

4. The switch assembly of claim 1 wherein the projection of said at least one tab is tapered on a side thereof adjacent to the first portion in order to facilitate insertion of said switch subassembly through the aperture from the front side of said panel.

5. The switch assembly of claim 1 wherein said at least one tab flexes inwardly toward the switch housing as said switch subassembly is inserted through the aperture in said panel and then flexes outwardly as the switch subassembly is fully seated in the aperture such that the at least one tab engages the aperture in said panel to secure the switch subassembly in the aperture.

6. The switch assembly of claim 1 wherein said at least one tab is formed of a resilient material.

7. The switch assembly of claim 6 wherein said at least one tab is formed of spring steel.

8. The switch assembly of claim 1 wherein the tab end terminates at a point between the front side and the back side of the panel.

9. The switch assembly of claim 1 wherein the tab end terminates at a point between the edge surface of the aperture of said panel and the switch subassembly.

10. The switch assembly of claim 1 wherein said switch subassembly further comprises at least one push button actuator actuatable in the longitudinal direction.

11. The switch assembly of claim 10 wherein the tab end terminates at a point between the edge surface of the aperture of said panel and the at least one push button actuator.

12. The switch assembly of claim 11 wherein the at least one push button actuator includes a cutout that accommodates the tab end.

13. The switch assembly of claim 12 wherein the cutout that accommodates the tab end allows for a plurality of switch subassemblies to be disposed with the tabs thereof adjacent to one another while maintaining a uniform gap between push button actuators disposed on one switch subassembly and between push button actuators disposed on adjacent switch subassemblies.

14. The switch assembly of claim 10 wherein a gap between the edge surface of the aperture and the at least one push button actuator is at most 1 mm.

15. The switch assembly of claim 14 wherein the gap between the edge surface of the aperture and the at least one push button actuator is between 0.5 mm and 1 mm.

16. The switch assembly of claim 1 wherein a retention force of the switch subassembly within the aperture of said panel is at least 50 N.

17. A switch assembly comprising:

a panel having a front side and a back side, said panel defining an aperture therethrough, the aperture having an edge surface perpendicular to the front and back sides;

a switch subassembly disposed through the aperture and having a switch housing defining a longitudinal direction that is perpendicular to said panel, and having an outer periphery dimensioned to fit within the edge surface of the aperture of said panel;

at least two tabs extending from opposite sides of the switch housing adjacent the back side of said panel, each of said at least two tabs having a first portion that extends away from said switch housing and toward the back side of said panel to a projection, the projection spaced in the longitudinal direction from the back side of the panel and laterally outward of the edge surface of the aperture when said at least two tabs are in a relaxed state, each of said at least two tabs having a second portion that extends from the projection in the longitudinal direction and terminates in a tab end disposed within the aperture of said panel;

wherein the tab end of each of said at least two tabs is accessible from the front side of said panel and wherein each of said at least two tabs is formed of a resilient material that is sufficiently flexible such that flexing the tab end inwardly from the front side of said panel causes the projection to flex inwardly from the relaxed state to a point where the projection can pass through the aperture to facilitate removal of the switch subassembly from the front side of said panel, and wherein said at least two tabs flex inwardly toward the switch housing as said switch subassembly is inserted through the aperture in said panel and then flex outwardly as the switch subassembly is fully seated in the aperture such that the at least two tabs engage the aperture in said panel to secure the switch subassembly in the aperture; and wherein the tab end of each of the at least two tabs terminates at a point between the front side and the back side of the panel and at a point between the edge surface of the aperture of said panel and the switch subassembly.

18. The switch assembly of claim 17 wherein the projection of each of said at least two tabs is tapered on a side thereof adjacent to the first portion in order to facilitate insertion of said switch subassembly through the aperture from the front side of said panel.

19. The switch assembly of claim 17 wherein said at least two tabs are formed of spring steel.

20. The switch assembly of claim 17 wherein said switch subassembly further comprises at least one push button actuator actuatable in the longitudinal direction.

21. The switch assembly of claim 20 wherein the tab end terminates at a point between the edge surface of the aperture of said panel and the at least one push button actuator.

22. The switch assembly of claim 21 wherein the at least one push button actuator includes a cutout that accommodates the tab end.

23. The switch assembly of claim 22 wherein the cutout that accommodates the tab end allows for a plurality of switch subassemblies to be disposed with the tabs thereof adjacent to one another while maintaining a uniform gap between push button actuators disposed on one switch subassembly and between push button actuators disposed on adjacent switch subassemblies.

24. The switch assembly of claim 20 wherein a gap between the edge surface of the aperture and the at least one push button actuator is at most 1 mm.

25. The switch assembly of claim 24 wherein the gap between the edge surface of the aperture and the at least one push button actuator is between 0.5 mm and 1 mm.

26. The switch assembly of claim 17 wherein a retention force of the switch subassembly within the aperture of said panel is at least 50 N.

* * * * *